April 7, 1942.  H. HOLLMANN  2,278,653
DIRECTION INDICATOR FOR ROAD VEHICLES
Filed July 12, 1939
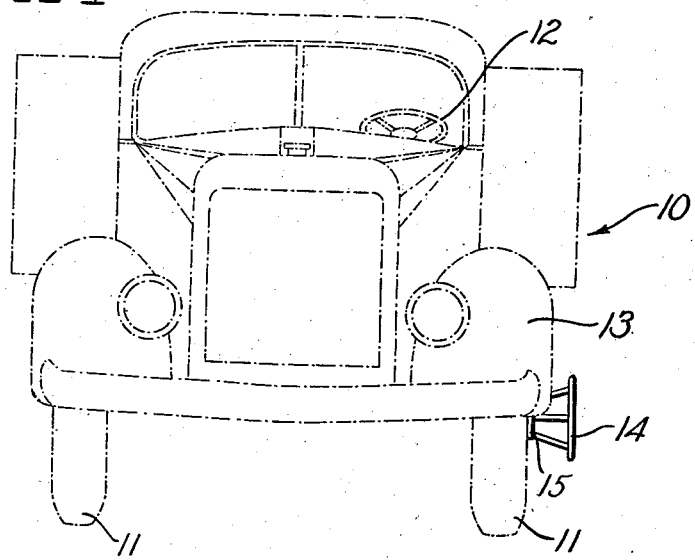
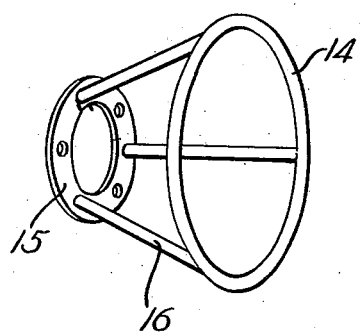
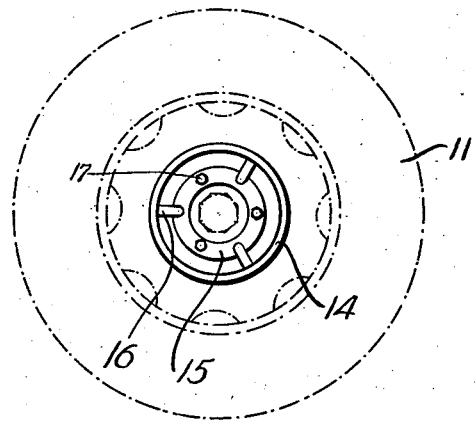
INVENTOR
Hubert Hollmann
BY
ATTORNEY Patented Apr. 7, 1942

2,278,653

UNITED STATES PATENT OFFICE 2,278,653

DIRECTION INDICATOR FOR ROAD VEHICLES

Hubert Hollmann, Findlay, Ohio, assignor to The Buckeye Traction Ditcher Company, Findlay, Ohio, a corporation of Ohio Application July 12, 1939, Serial No. 284,079

3 Claims. (Cl. 116—31)

This invention relates to direction indicators for road vehicles, but more particularly to indicators of this character for slow moving vehicles, such as heavy trucks, which are required to move in an approximately straight line.

It is difficult to drive a slow moving vehicle along a straight path without the use of some device to indicate to the driver that the road wheels are straight and not turned to the right or left. This is particularly the case with trucks equipped with road working apparatus, which travel very slowly or at such rate of speed that the driver cannot determine the position of the front wheels without leaning out of his seat to inspect them, or without the use of some other device, such as providing some indicia on the steering wheel.

An object is to produce a simple and efficient device for readily and conveniently indicating to the driver of a slow moving road vehicle whether his front wheels are straight or inclined to the right or left.

Other objects will hereinafter appear, and, for purposes of illustration, but not of limitation, an embodiment of the invention is shown on the accompanying drawing, in which:

Figure 1 is a front end elevation of a truck equipped with my direction indicating device;

Figure 2 is a side view of one of the front wheels with the direction indicator thereon; and Figure 3 is a perspective view of the direction indicator.

The illustrated embodiment of the invention comprises a road vehicle 10 in the form of a truck, which in use moves very slowly. Trucks of this character are used in a variety of places, such, for example, as in road work, where the travel is excedingly slow, about three (3) inches to fifty (50) feet per minute. The front road wheels 11 are turned by the steering wheel 12 in the usual manner to control the direction of travel of the vehicle. The upper portion of each of the wheels 11 is covered by the customary fender or mud guard 13.

Projecting outwardly slightly beyond the fender 13 on the steering wheel side of the truck, is an annulus or ring 14, which may be in the form of a continuous metal tube or rod. The annulus 14 is arranged concentrically or coaxially with respect to the adjacent road wheel 11 and in parallel relationship to it. As above, the annulus projects outwardly just far enough so that it can be conveniently seen by the driver in rear of the steering wheel 12. In this instance the annulus 14 is connected to a smaller flat metal ring 15 by spokes or rods 16, there being three spokes which converge toward the ring 15 and are relatively widely spaced. The flat ring 15 is secured by bolts 17 to the hub of the road wheel.

In operation, it will be apparent that so long as the front steering road wheels 11 are straight so that the vehicle is advancing straight ahead, the driver will note that the annulus will appear as indicated in Figure 1, and will see merely what appears to be a straight rod disposed vertically. If the wheels 11 are turned either to one side or the other, the driver will see an ellipse inclined in the direction in which the wheels are turned. Thus, by an exceedingly simple expedient, the driver can conveniently determine the position of the front wheels 11, and without difficulty direct the vehicle along the desired path.

Numerous changes in details of construction and arrangement may be effected without departing from the spirit of the invention, especially as defined in the appended claims.

What I claim is:

1. A direction indicator for road vehicles having front wheel fenders, comprising an annular member, mounting means formed for connection to a front wheel of the vehicle so as to rotate therewith, and means connected to the annular member and to the mounting means for supporting the member so as to rotate with the wheel, and for disposing the member at points spaced outwardly of the vehicle fender and the front wheel that is adjacent to the driver's seat, and at such distance from said wheel so as to be visible to the driver, and also in a vertical plane parallel to the plane in which the wheel rotates, said member being of narrow width to present a constant indicating line to the vision of the driver irrespective of the speed of travel of the vehicle, and being disposed so that the line of vision of the operator lies in the vertical plane of the annular member with respect to a predetermined line of travel of the wheel upon which the indicating number is supported.

2. A direction indicator in accordance with claim 1, wherein the annular member is composed of a ring.

3. A direction indicator in accordance with claim 1, wherein the annular member is composed of a ring and which is of a diameter considerably greater than that of the hub of the wheel, and wherein the means connecting the ring and mounting means consists of spaced rods.

HUBERT HOLLMANN.